US006020828A

United States Patent [19]

Gotou

[11] Patent Number: 6,020,828

[45] Date of Patent: Feb. 1, 2000

[54] SELECTIVE CALL RECEIVER HAVING ABSTRACT ICON MESSAGE DISPLAY

[75] Inventor: Kazuhumi Gotou, Shizuoka, Japan

[73] Assignee: NEC Corporation, Tokyo, Japan

[21] Appl. No.: 08/884,036

[22] Filed: Jun. 27, 1997

[30] Foreign Application Priority Data

Jun. 28, 1996 [JP] Japan .................................... 8-188334

[51] Int. Cl.[7] ........................................................ H04Q 7/18

[52] U.S. Cl. ................................ 340/825.44; 340/825.69; 340/815.53; 455/38.4; 455/575; 455/566; 370/313; 345/349; 345/509

[58] Field of Search ............................ 340/825.44, 311.1, 340/825.69, 815.4, 815.53; 455/38.4, 140, 526, 517, 575, 38.1, 566; 370/313; 345/133, 348, 349, 141, 509, 194, 214, 87; 313/513; 349/16; 1/1

[56] References Cited

U.S. PATENT DOCUMENTS

| | | | |
|---|---|---|---|
| 4,951,039 | 8/1990 | Schwendeman et al. | 340/825.44 X |
| 5,182,553 | 1/1993 | Kung | 340/825.44 |
| 5,293,484 | 3/1994 | Dabbs, III et al. | 340/825.44 X |
| 5,379,030 | 1/1995 | Nolan et al. | 340/825.44 X |
| 5,491,785 | 2/1996 | Robson et al. | 455/38.4 X |
| 5,539,529 | 7/1996 | Merchant | 340/825.44 X |
| 5,784,001 | 7/1998 | Deluca et al. | 340/825.44 |

FOREIGN PATENT DOCUMENTS

| | | |
|---|---|---|
| 0 686 949 | 12/1995 | European Pat. Off. . |
| 3-136527 | 6/1991 | Japan . |
| 4-302231 | 10/1992 | Japan . |
| 5-110497 | 4/1993 | Japan . |
| 7-336744 | 12/1995 | Japan . |
| 8-8815 | 1/1996 | Japan . |
| 8-9436 | 1/1996 | Japan . |
| WO 91/03885 | 3/1991 | WIPO . |
| WO 96/11454 | 4/1996 | WIPO . |

*Primary Examiner*—Michael Horabik
*Assistant Examiner*—William H. Wilson, Jr.
*Attorney, Agent, or Firm*—Young & Thompson

[57] ABSTRACT

A selective call receiver includes a memory storing a plurality of icons which are associated with different pieces of objective information, respectively. When a received message includes the icon designation data and a message, an abstract icon corresponding to the icon designation data is displayed at a predetermined place on screen together with the message. A user may assign objective information to respective ones of the abstract icons.

6 Claims, 3 Drawing Sheets

SELECTIVE CALL RECEIVER HAVING ABSTRACT ICON MESSAGE DISPLAY

BACKGROUND OF THE INVENTION

1. Field of the Invention

The present invention generally relates to a selective call receiver having a display function for displaying a received message, and in particular to a message displaying method and apparatus thereof.

2. Description of the Related Art

A selective call receiver has been widely used for various purposes and, especially, a small-sized and lightweight selective call receiver called a pager is suitable for being taken on the road. One of basic functions of the selective call receiver is to indicate by beep sound, vibration, or light the incoming call.

Further, some selective call receivers have not only such an informing function but also a function of displaying a message on an liquid-crystal display (LCD) with received numeric data only. However, since only numerals are used to display information on LCD, the transmitted information cannot be interpreted with precision. For this, as a desperate measure, a pun of numerals is frequently used to inform a user of the information in practice.

To improve power of expression, a selective call receiver which can display a plurality of face looks on screen has been proposed in Japanese Patent Unexamined Publication No. 7-336744. More specifically, the selective call receiver is provided with a memory storing a plurality of patterns each representing a different face look, for example, a joyful face, an angry face, a tearful face and the like. When receiving a selective calling signal including a fixed-message number as well as a feeling number specifying one of face looks, the selective call receiver displays the fixed message corresponding to the fixed-message number and the face look corresponding to the feeling number on screen. Therefore, a sender can transmit a feeling expression to the receiver by selecting one of the feeling numbers.

SUMMARY OF THE INVENTION

However, it is difficult for the conventional receiver to convey objective information to the receiver's user, for example, who sends this message, what is required, where the sender is, or how the sender moves. According to the conventional receiver, there is no other means but an ambiguous method using a pun of numerals to convey the objective information like these.

An object of the present invention is to provide a selective call receiver which displays objective information with precision.

Another object of the present invention is to provide a selective call receiver which displays objective information an easy-to-understand image a screen.

Still another object of the present invention is to provide a selective call receiver which displays objective information with precision and without increasing the amount of hardware.

According to the present invention, in a selective call receiver having a display device, predetermined icon data is stored in a memory, the predetermined icon data comprising a plurality of icons which are associated with different pieces of objective information, respectively. When the received message data includes the icon designation data, an icon corresponding to the icon designation data is displayed at a predetermined place on screen of the display device.

Since the objective information is displayed with an icon on a screen and further the pattern of each icon is associated with objective information, objective information can be displayed in an easy-to-understand image on the screen, resulting in reliable communications.

Further, when the received message data includes message data other than the icon designation data, the message data and the icon corresponding to the icon designation data may be displayed on screen. Since the objective information and the message data are displayed as a single message on the screen. The result is more reliable communication.

Furthermore, each of the icons may have an abstract pattern which is associated with objective information. Since the abstract pattern occupies less memory, the objective information can be displayed on screen with precision and without increasing in the amount of hardware.

DETAILED DESCRIPTION OF THE PREFERRED EMBODIMENT

Figure 1:
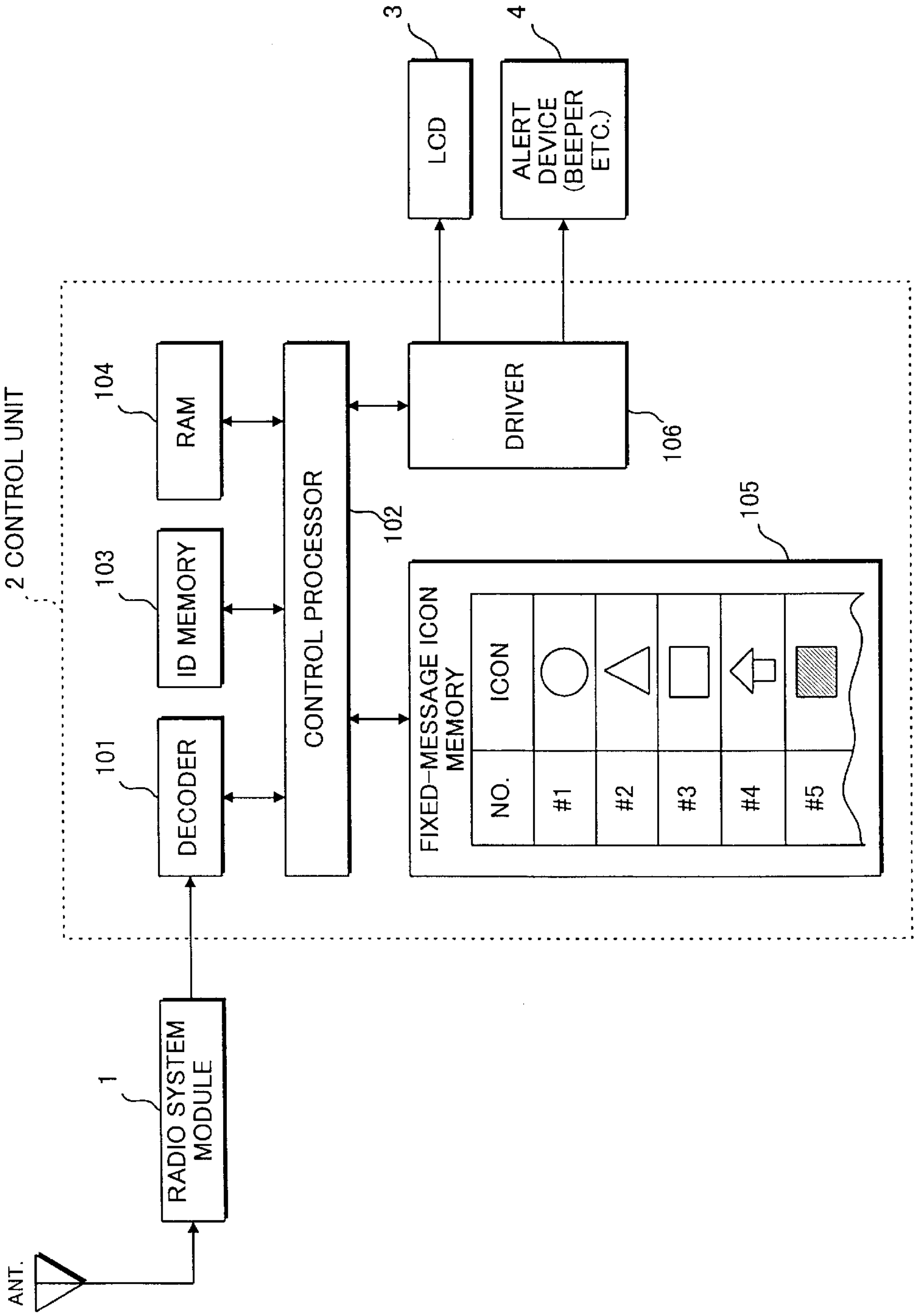
FIG. 1 is a block diagram showing the functional arrangement of an embodiment of a radio selective calling receiver according the present invention.

Referring to FIG. 1, a radio selective calling receiver according to the present invention is comprised of a radio system module 1, a control unit 2, a display device 3 such as an LCD, and an alert device 4 including a speaker and/or a vibrator. The radio system module 1 is comprised of a built-in antenna and a radio receiver including a digital demodulator. The radio receiver 101 receives a digital-modulated radio signal from a radio base station (not shown) of a selective calling system through the built-in antenna. The digital demodulator demodulates the received radio signal into a baseband signal which is transferred as a selective call signal from the radio system module 1 to the control unit 2.

The control unit 2 includes a decoder 101 and a control processor 102. The decoder 101 decodes the selective call signal into received data which is output to the control processor 102. The control processor 102 executes an operating program and other function programs stored in a program ROM (not shown) to perform the operation control of the selective call receiver. When receiving the received data from the decoder 101, the control processor 102 compares the selective calling number included in the received data with the identification (ID) number stored in an ID memory 103 which may be an EEPROM (electrically-erasable programmable read-only memory) When the selective calling number is identical to the ID number, the control processor 102 outputs message data of the received data to a random access memory (RAM) 104. As will be described later, the message data includes an icon shift code which is used to select a specific icon.

The control unit 2 is further comprised of a fixed-message icon memory 105 which stores a plurality of icons (here, five icons) having different shapes which are numbered in sequence. Preferably, each icon has a shape which is easily associated with a specific objective image or meaning such as place, building, or personality. From the view point of a user, however, abstract or geometrical shapes including circle, triangle, and rectangle may be useful because the user can assign desired meanings to them. Further, abstract shapes like these use a reduced amount of memory. In this embodiment, as an example, the icon #1 indicates "the user's friend A", the icon #2 indicates "the user's friend B", the icon #3 indicates "the office", the icon #4 indicates "the user's home" and so on. Needless to say, the reason why the respective icons #3 and #4 are determined as "the office" and "the user's home" is that these icons have a shape which is associated with a building.

Since the fixed-message icons are predetermined, they may be stored in the ID memory 103 or the program ROM (not shown). In the case where the fixed-message icons arestored in a rewritable memory such as the ID memory 103, the fixed-message icons can be rewritten from outside, resulting in increased freedom of choice.

When the selective calling number is identical to the ID number as described before, the control processor 102 controls a driver 106 such that the speaker makes a beep or the vibrator generates vibration for notifying the user of the incoming call. When the user is aware of an incoming call through the alert device 4, the user manually operates a keypad (not shown) to stop the alert device 4 working. By the user pressing a function key of the keypad, the received message data is read from the RAM 104 and the message is displayed on screen with a fixed-message icon as will be described later.

Figure 2:
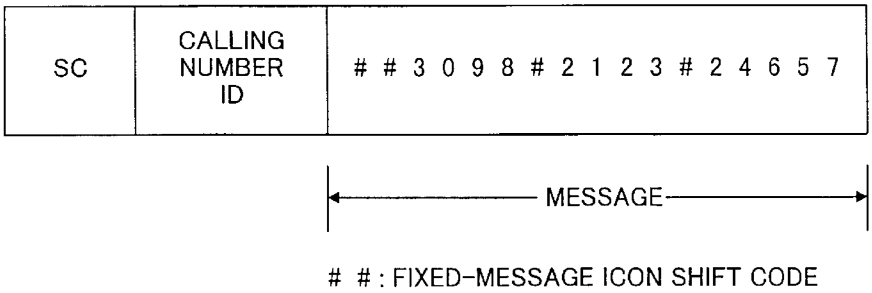
FIG. 2 is a schematic diagram showing the format of a signal which is received by the embodiment.

As illustrated in FIG. 2, a selective calling signal includes a synchronization code SC and the selective calling number which are followed by a message field. The message field conveys numeric or alphanumeric characters written by a sender. If the first two characters of the message field are predetermined characters (here, "##"), the numeric character following them is recognized as a fixed-message icon number (here, "3"). A string of characters following the fixed-message icon number is recognized as a main message. In this case, a character string of "098#2123#24657" is recognized as the received main message and is displayed on screen. Hereinafter, "##" is called an icon shift code and the numeric character following it is called an icon data.

Figure 3A:
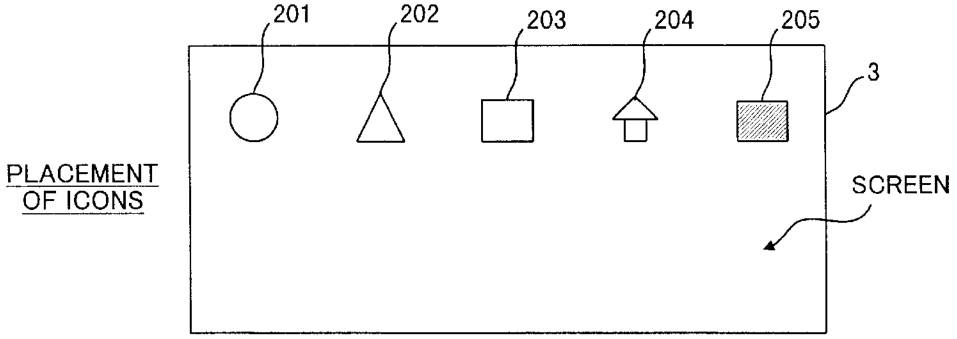
FIG. 3A is a schematic diagram showing an example of the placement of fixed-message icons on screen.

As shown in FIG. 3A, predetermined icons 201–205 are placed at predetermined positions of the LCD screen, corresponding to the icons #1–#5 stored in the fixed-message icon memory 105, respectively. Needless to say, a desired placement of the icons may be employed. Since the placement of the icons is predetermined, the displayed image is easier to understand. Alternatively, a fixed-message icon may be displayed at a predetermined place.

Figure 3B:
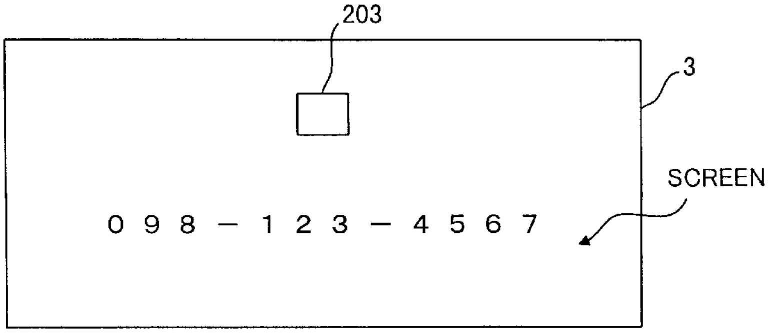
FIG. 3B is a schematic diagram showing an example of fixed-message icon and message displayed on screen after the corresponding message is received.

As shown in FIG. 3B, when the selective calling number is identical to the ID number, according to the icon data following the icon shift code, the designated icon (here, the third icon #3) is selected and displayed on screen together with the main message. In this case, since the icon #3 is selected, the displayed main message "098-123-4567" is information regarding the office. In other words, the objective information "Office" and the concrete information "098-123-4567" are displayed as a single message on screen, resulting in reliable communication.

From the displayed screen as shown in FIG. 3B, the user can know this call is associated with the office. However, the interpretation of the image on screen may be different depending on user's environment. For example, a user may interpret the message as "Call Office: 098-123-4567", another user may interpret it as "Called from Office. Call: 098-123-4567", or still another user may interpret it as "Matters Regarding Office. Call back: 098-123-4567". In any case, it is clear that the received message is associated with the office. Therefore, according to the present embodiment, only three characters, that is, the icon shift data and the icon data are used to display objective information on screen and tell it to the receiver with precision and reliability.

Figure 4:
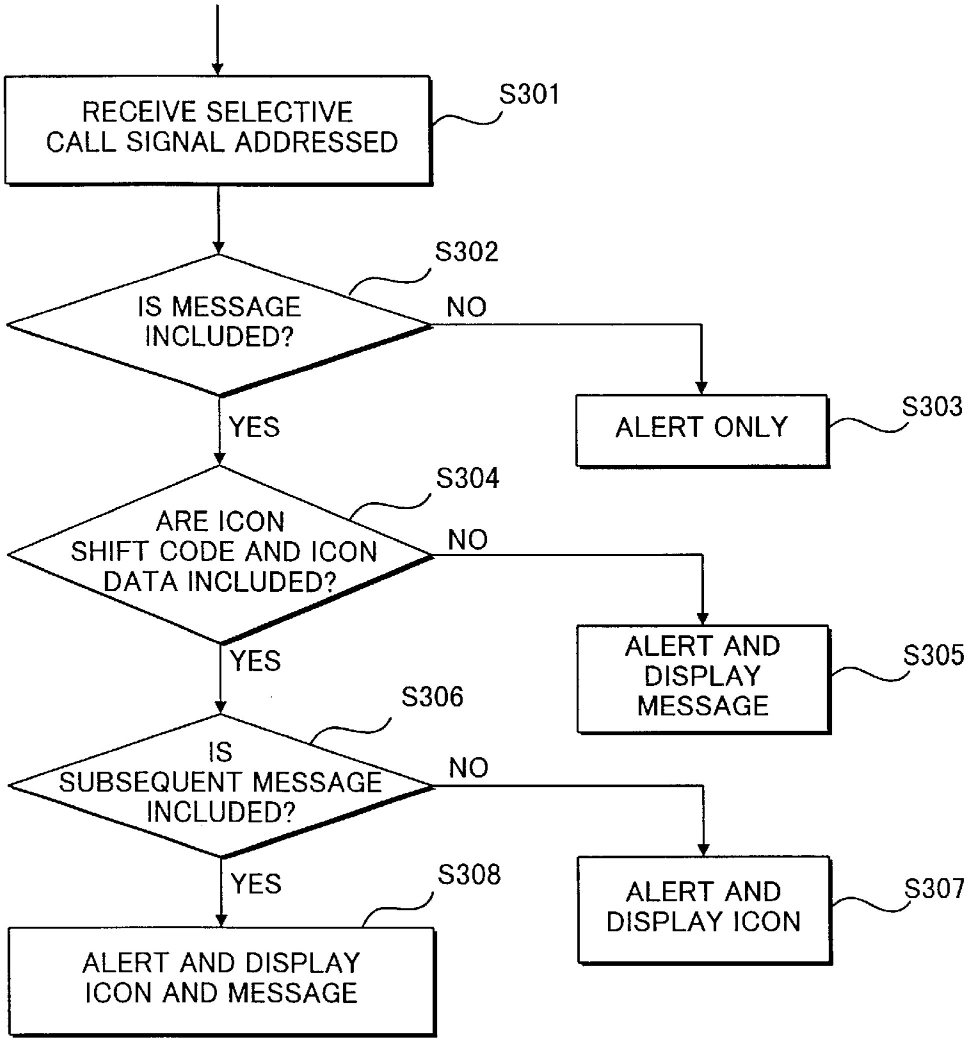
FIG. 4 is a flowchart showing a displaying operation of the embodiment.

Referring to FIG. 4, when the selective calling number is identical to the ID number (step S301), the control processor 102 checks whether a message is included in the receive signal (S302). If no message is included (NO in step S302), the control processor 102 controls the driver 106 to start the alert device 4 working. That is, the speaker makes a beep, the vibrator vibrates or the LED blinks to inform the user of the incoming call (step S303).

When a message is included (YES in step S302), the control processor 102 further checks whether the icon shift code "##" and the icon data following it are included in the message field (step S304). More specifically, it is checked whether the icon shift code "##" is included and, if it is included, then it is subsequently checked whether the icon data is included. Since the number of predetermined icons is determined in advance (here, five icons) as described before, the numeral of the icon data is zeros or greater than the predetermined value (here, five), it is determined that the icon data is not included in the message field. In this manner, when the icon shift code "##" is not included or when the icon data is not included (NO in step S304), the control processor 102 controls the driver 106 to start the alert device 4 working and to display the received message on the LCD 3 (step S305).

When the icon shift code "##" and the icon data following it are included in the message field (YES in step S304), the control processor 102 checks whether a message following the icon data is included in the message field (step S306). In the case where such a subsequent message is not included (NO in step S306), the control processor 102 controls the driver 106 to start the alert device 4 working and reads the designated icon corresponding to the icon data to display it on the LCD 3 (step S307). In the case where the icon data is "3", the third icon #3 indicating "Office" is displayed at the predetermined position on screen.

In the case where a subsequent message is included (YES in step S306), the control processor 102 controls the driver 106 to start the alert device 4 working and reads the designated icon corresponding to the icon data to display the designated icon and the subsequent message on the LCD 3 (step S308). In the case where the icon data is "3", the third icon #3 indicating "Office" and the message "098-123-4567" are displayed at the predetermined position on screen as shown in FIG. 3B.

In the above embodiment, the respective icons #1–#5 having the shapes as shown in FIG. 1 are stored in the fixed-message icon memory 105. Needless to say, the present invention is not restricted to such a set of icons. A desired number of icons each having an abstract shape associated with object information may be stored.

What is claimed is:

1. A method for displaying a message on screen in a selective call receiver having a display device, the method comprising the steps of:

storing predetermined icon data comprising a plurality of icons which have abstract geometrical shapes;

a user of the selective call receiver assigning different pieces of objective information to each of the plurality of icons, respectively;

checking whether received message data includes icon designation data; and displaying an icon corresponding to the icon designation data at a predetermined place on screen of the display device when the received message data includes the icon designation data.

2. The method according to claim 1, wherein predetermined numerals are previously assigned to the icons, respectively, and the icon designation data comprises one of the numerals.

3. The method according to claim 2, wherein the icon designation data further comprises a predetermined code followed by one of the numerals, wherein the checking step comprises:

checking whether the received message data includes the predetermined code; and checking whether one of the numerals follows the predetermined code when the received message data includes the predetermined code.

4. The method according to claim 1, wherein predetermined places on screen of the display device are previously assigned to the icons, respectively.

5. The method according to claim 1, wherein the objective information includes information regarding at least one of place, occupation and personality.

6. The method according to claim 1, further comprising the step of checking whether the received message data includes message data other than the icon designation data, wherein, in the displying step, the message data and the icon corresponding to the icon designation data are displayed at predetermined places on screen of the display device when the received message data includes the icon designation data and the message data.

* * * * *